(12) United States Patent
Lafferty

(10) Patent No.: US 8,872,079 B2
(45) Date of Patent: Oct. 28, 2014

(54) APPARATUS FOR PREPARING A FOOD ITEM IN A MICROWAVE OVEN

(75) Inventor: Terrence P. Lafferty, Winneconne, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 1027 days.

(21) Appl. No.: 12/378,574

(22) Filed: Feb. 17, 2009

(65) Prior Publication Data

US 2009/0206075 A1    Aug. 20, 2009

Related U.S. Application Data

(60) Provisional application No. 61/029,470, filed on Feb. 18, 2008.

(51) Int. Cl.
*H05B 6/80* (2006.01)
*H05B 6/64* (2006.01)
*A47J 36/02* (2006.01)

(52) U.S. Cl.
CPC ............ *H05B 6/6494* (2013.01); *A47J 36/027* (2013.01)
USPC ....................................................... 219/734

(58) Field of Classification Search
USPC .......... 219/728, 730, 733, 734, 735; 426/234, 426/243, 107; 206/491, 564, 521.1–523
See application file for complete search history.

(56) References Cited

U.S. PATENT DOCUMENTS

| | | | |
|---|---|---|---|
| 2,859,122 A | 11/1958 | Maturi et al. | |
| 3,965,323 A | 6/1976 | Forker, Jr. et al. | |
| 4,175,483 A | 11/1979 | Clark | |
| 4,606,496 A | 8/1986 | Marx et al. | |
| 4,609,140 A | 9/1986 | Van Handel et al. | |
| 4,721,499 A | 1/1988 | Marx et al. | |
| 4,721,500 A | 1/1988 | Van Handel et al. | |
| 4,775,771 A | 10/1988 | Pawlowski | |
| 4,777,053 A | 10/1988 | Tobelmann et al. | |
| 4,794,005 A | 12/1988 | Swiontek | |
| 4,831,224 A | 5/1989 | Keefer | |
| 4,832,676 A | 5/1989 | Johns et al. | |

(Continued)

FOREIGN PATENT DOCUMENTS

| | | |
|---|---|---|
| AU | 635667 B2 | 3/1993 |
| CA | 1279902 | 2/1991 |

(Continued)

OTHER PUBLICATIONS

Supplementary European Search Report mailed Feb. 22, 2011, for EP 08 75 5465.

(Continued)

*Primary Examiner* — Henry Yuen
*Assistant Examiner* — Thomas Ward
(74) *Attorney, Agent, or Firm* — Womble Carlyle Sandridge & Rice, LLP

(57) ABSTRACT

An apparatus for preparing a food item in a microwave oven comprises a tray including a plurality of elevated heating areas and a plurality of channels disposed between the elevated heating areas, the elevated heating areas each including a microwave energy interactive material, a cover pivotably connected to the tray for pivoting the cover relative to the tray between an open position and a closed position, and a locking feature operative for releasably maintaining the cover in the closed position.

19 Claims, 2 Drawing Sheets

(56) References Cited

U.S. PATENT DOCUMENTS

| | | | |
|---|---|---|---|
| 4,862,791 A * | 9/1989 | Baughey | 99/400 |
| 4,865,921 A | 9/1989 | Hollenberg | |
| 4,866,234 A | 9/1989 | Keefer | |
| 4,870,233 A | 9/1989 | McDonald et al. | |
| 4,888,459 A | 12/1989 | Keefer | |
| 4,890,439 A | 1/1990 | Smart | |
| 4,916,280 A | 4/1990 | Havette | |
| 4,936,935 A | 6/1990 | Beckett | |
| 4,963,424 A | 10/1990 | Beckett | |
| 5,026,958 A | 6/1991 | Palacios | |
| 5,039,364 A | 8/1991 | Beckett et al. | |
| 5,117,078 A | 5/1992 | Beckett | |
| 5,213,902 A | 5/1993 | Beckett | |
| 5,217,768 A | 6/1993 | Walters et al. | |
| 5,221,419 A | 6/1993 | Beckett | |
| 5,260,537 A | 11/1993 | Beckett | |
| 5,266,386 A | 11/1993 | Beckett | |
| 5,298,708 A * | 3/1994 | Babu et al. | 219/728 |
| 5,310,977 A | 5/1994 | Stenkamp et al. | |
| 5,310,980 A | 5/1994 | Beckett | |
| 5,317,118 A | 5/1994 | Brandberg et al. | |
| RE34,683 E | 8/1994 | Maynard | |
| 5,340,436 A | 8/1994 | Beckett | |
| 5,350,904 A | 9/1994 | Kemske et al. | |
| 5,354,973 A | 10/1994 | Beckett | |
| 5,410,135 A | 4/1995 | Pollart | |
| 5,424,517 A | 6/1995 | Habeger | |
| 5,519,195 A | 5/1996 | Keefer | |
| 5,565,228 A | 10/1996 | Gics | |
| 5,585,027 A | 12/1996 | Young | |
| 5,628,921 A | 5/1997 | Beckett | |
| 5,672,407 A | 9/1997 | Beckett | |
| 5,698,127 A | 12/1997 | Lai et al. | |
| 5,759,422 A | 6/1998 | Schmelzer | |
| 5,800,724 A | 9/1998 | Habeger | |
| 6,114,679 A | 9/2000 | Lai | |
| 6,150,646 A | 11/2000 | Lai | |
| 6,150,647 A | 11/2000 | Anderson et al. | |
| 6,204,492 B1 | 3/2001 | Zeng | |
| 6,251,451 B1 | 6/2001 | Zeng | |
| 6,414,290 B1 | 7/2002 | Cole | |
| 6,415,944 B1 | 7/2002 | Toussant | |
| 6,433,322 B2 | 8/2002 | Zeng | |
| 6,455,827 B2 | 9/2002 | Zeng | |
| 6,463,844 B1 | 10/2002 | Wang et al. | |
| 6,501,059 B1 * | 12/2002 | Mast | 219/730 |
| 6,552,315 B2 | 4/2003 | Zeng | |
| 6,608,292 B1 * | 8/2003 | Barnes | 219/730 |
| 6,639,199 B1 | 10/2003 | Ross, Jr. | |
| 6,651,874 B1 | 11/2003 | Pedersen | |
| 6,677,563 B2 | 1/2004 | Lai | |
| 6,717,121 B2 | 4/2004 | Zeng | |
| 6,765,182 B2 | 7/2004 | Cole | |
| 6,919,547 B2 | 7/2005 | Tsontzidis | |
| 6,988,654 B2 | 1/2006 | Wnek | |
| 7,019,271 B2 | 3/2006 | Wnek et al. | |
| 7,205,517 B2 | 4/2007 | Hoh | |
| 7,323,669 B2 | 1/2008 | Robison et al. | |
| 7,351,942 B2 | 4/2008 | Wnek et al. | |
| 7,365,292 B2 | 4/2008 | Cole et al. | |
| 7,476,830 B2 | 1/2009 | Middleton et al. | |
| 7,541,562 B2 | 6/2009 | Cole et al. | |
| 2001/0000732 A1 | 5/2001 | Hopkins, Sr. | |
| 2001/0021405 A1 | 9/2001 | Zeng | |
| 2003/0085224 A1 | 5/2003 | Tsontzidis et al. | |
| 2004/0216730 A1 | 11/2004 | Sawhney et al. | |
| 2005/0205565 A1 | 9/2005 | Cole | |
| 2006/0011620 A1 | 1/2006 | Tsontzidis | |
| 2006/0113300 A1 | 6/2006 | Wnek | |
| 2007/0029316 A1 * | 2/2007 | Fernandez | 219/730 |
| 2007/0221666 A1 | 9/2007 | Keefe et al. | |
| 2008/0000896 A1 * | 1/2008 | Lafferty et al. | 219/730 |
| 2008/0081095 A1 * | 4/2008 | Cole et al. | 426/107 |
| 2008/0164178 A1 | 7/2008 | Wnek et al. | |
| 2009/0206074 A1 | 8/2009 | Schneider et al. | |
| 2010/0278990 A1 | 11/2010 | Wnek et al. | |

FOREIGN PATENT DOCUMENTS

| | | |
|---|---|---|
| DE | 79 03 283 U1 | 5/1979 |
| EP | 0007522 A1 | 2/1980 |
| EP | 0 246 041 A2 | 11/1987 |
| EP | 0 382 399 A2 | 8/1990 |
| GB | 2 407 153 A | 4/2005 |
| JP | S62-293020 | 12/1987 |
| JP | 07-033228 U | 6/1995 |
| JP | 15-095332 | 4/2003 |
| JP | 2003165582 A | 6/2003 |
| JP | 19-312819 | 12/2007 |
| KR | 10-0436263 | 6/2004 |
| KR | 10-0436263 B1 | 6/2004 |
| KR | 10-0813904 B1 | 3/2008 |
| WO | WO 93/23971 A1 | 11/1993 |
| WO | WO 95/24110 A2 | 9/1995 |
| WO | WO 96/22228 A2 | 7/1996 |
| WO | WO 03/041451 A1 | 5/2003 |
| WO | WO 2004/020310 A1 | 3/2004 |
| WO | WO 2005/085091 A2 | 9/2005 |
| WO | WO 2007/133767 A2 | 2/2008 |
| WO | WO 2008/144343 A2 | 11/2008 |
| WO | WO 2009/105397 A2 | 8/2009 |
| WO | WO 2009/105398 A2 | 8/2009 |
| WO | WO 2010/127214 A2 | 11/2010 |

OTHER PUBLICATIONS

International Search Report and Written Opinion mailed Jan. 28, 2011, for PCT/US2010/033118.
International Search Report—PCT/US2009/034190, publication date Sep. 21, 2009, Graphic Packaging International, Inc.
Written Opinion—PCT/US2009/034190, publication date Sep. 21, 2009, Graphic Packaging International, Inc.
Notice of Allowance and Fee(s) Due dated Jul. 30, 2012 for U.S. Appl. No. 12/008,356.
International Search Report—PCT/US2009/034191, publication date Feb. 16, 2009.
Written Opinion—PCT/US2009/034191, publication date Feb. 16, 2009.
Notification of Reason for Refusal for JP 2012-100796 dated Jun. 20, 2013 with English translation.
Supplementary European Search Report for EP 09 71 1698 dated Mar. 28, 2013.
Supplementary European Search Report for EP 09 71 2150 dated Mar. 26, 2013.
International Search Report—PCT/US2007/011615, publication date May 15, 2007, Graphic Packaging International, Inc.
Written Opinion—PCT/US2007/011615, publication date May 15, 2007, Graphic Packaging International, Inc.
International Search Report—PCT/US2008/063615, publication date May 14, 2008, Graphic Packaging International, Inc.
Written Opinion—PCT/US2008/063615, publication date May 14, 2008, Graphic Packaging International, Inc.

* cited by examiner

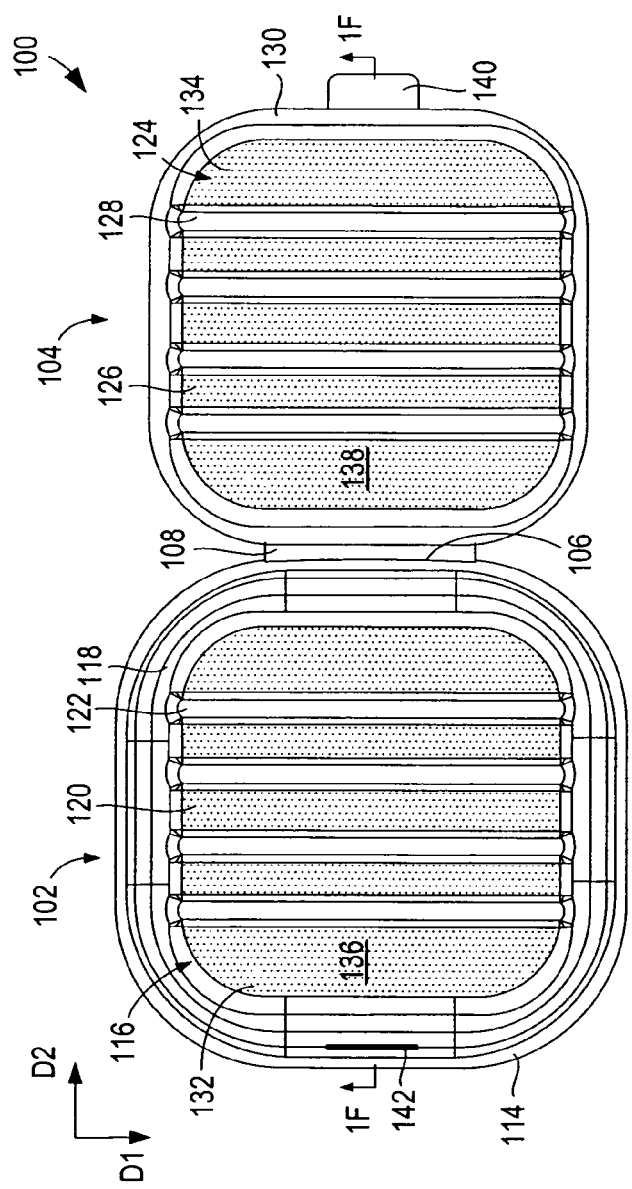
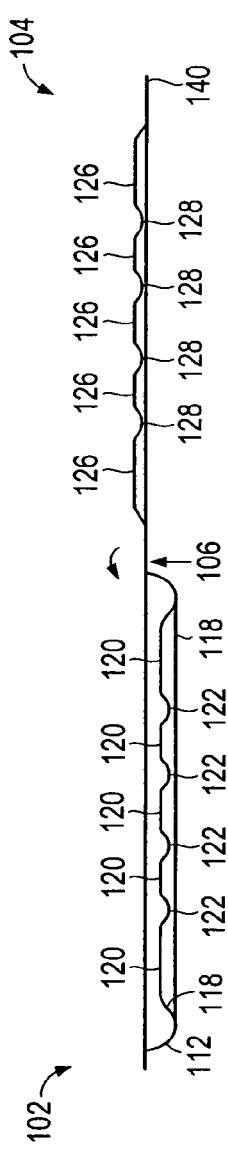
FIG. 1E
FIG. 1F

APPARATUS FOR PREPARING A FOOD ITEM IN A MICROWAVE OVEN

CROSS-REFERENCE TO RELATED APPLICATION

This application claims the benefit of U.S. Provisional Application No. 61/029,470, filed Feb. 18, 2008, which is incorporated by reference herein in its entirety.

TECHNICAL FIELD

Various constructs or apparatuses for heating or cooking a food item in a microwave oven are disclosed. In particular, this disclosure relates to various constructs and systems for heating or cooking a food item in a microwave oven, where the food item may have more than one surface to be browned and/or crisped.

BACKGROUND

Microwavable packages provide a convenient means for preparing a variety of food items in a microwave oven. However, many of such packages tend to brown and/or crisp only one surface of the food item at a time, so the food item must be rotated and/or inverted during heating. Thus, there is a need for a microwave heating construct that is capable of browning and/or crisping multiple surfaces of a food item concurrently.

SUMMARY

This disclosure is directed generally to various apparatuses and methods for preparing a food item in a microwave oven. The apparatus generally comprises a pair of opposed heating surfaces, constructs, or structures (e.g, tray and cover) adapted to heat, brown, and/or crisp multiple sides of a food item simultaneously. One or both of the opposed structures may be shaped and/or contoured to accommodate the shape of food item. The structures may be joined to one another and/or may include a locking mechanism to secure the structures in a superposed, substantially parallel relationship with one another. The apparatus may be formed from a disposable material, for example, paperboard, molded pulp, molded fiber, or a polymeric material.

The apparatus may be used to prepare various food items in a microwave oven, for example, waffles, French toast, pancakes, sandwiches, breaded food items, or any other food item that desirably is heated, browned, and/or crisped on more than one side or surface.

In one exemplary embodiment, an apparatus for preparing a food item in a microwave oven comprises a tray, a cover pivotably connected to the tray for pivoting the cover relative to the tray between an open position and a closed position, and a locking feature operative for releasably maintaining the cover in the closed position. The tray includes a plurality of elevated heating areas and a plurality of channels disposed between the elevated heating areas. At least a portion of at least some of the heating areas include a microwave energy interactive material, for example, a microwave energy interactive material operative for converting at least a portion of impinging microwave energy into thermal energy.

The elevated heating areas may have any suitable profile, for example, a substantially planar profile or a contoured profile. Likewise, the channels may have any suitable profile, for example, a substantially semi-circular profile. The channels may be arranged in any manner, and in one example, the channels are substantially parallel to one another.

The cover may likewise include a plurality of heating areas, each including a microwave energy interactive material, and a plurality of channels disposed between the heating areas of the cover. The channels in the cover may generally recede in a direction away from the tray when the cover is in the closed position. The heating areas of the cover may have any suitable profile, for example, a substantially planar profile or a contoured profile. The channels in the tray and the channels in the cover may be in register with one another or may be out of register with one another when the cover is in the closed position.

The cover may be pivotably connected to the tray by a separator panel. The locking feature may include a slot in the tray distal from the separator panel, and a tab extending from a portion of the cover distal from the separator panel, where the tab is adapted to be received in the slot. When the tab is inserted into the slot, the cover is urged towards the tray.

Additional aspects, features, and advantages of the present invention will become apparent from the following description and accompanying figures.

BRIEF DESCRIPTION OF THE DRAWINGS

The description refers to the accompanying drawings in which like reference characters refer to like parts throughout the several views, and in which:

FIG. 1E is a schematic top plan view of the microwave heating apparatus of FIG. 1A, in a fully open configuration; and FIG. 1F is a schematic cross-sectional view of the microwave heating apparatus of FIG. 1E, taken along a line 1F-1F.

DESCRIPTION

The present invention may be illustrated further by referring to the figures. For purposes of simplicity, like numerals may be used to describe like features. It will be understood that where a plurality of similar features are depicted, not all of such features necessarily are labeled on each figure. It also will be understood that various components used to form the apparatuses of the present invention may be interchanged. Thus, while only certain combinations are illustrated herein, numerous other combinations and configurations are contemplated hereby.

Figure 1A:
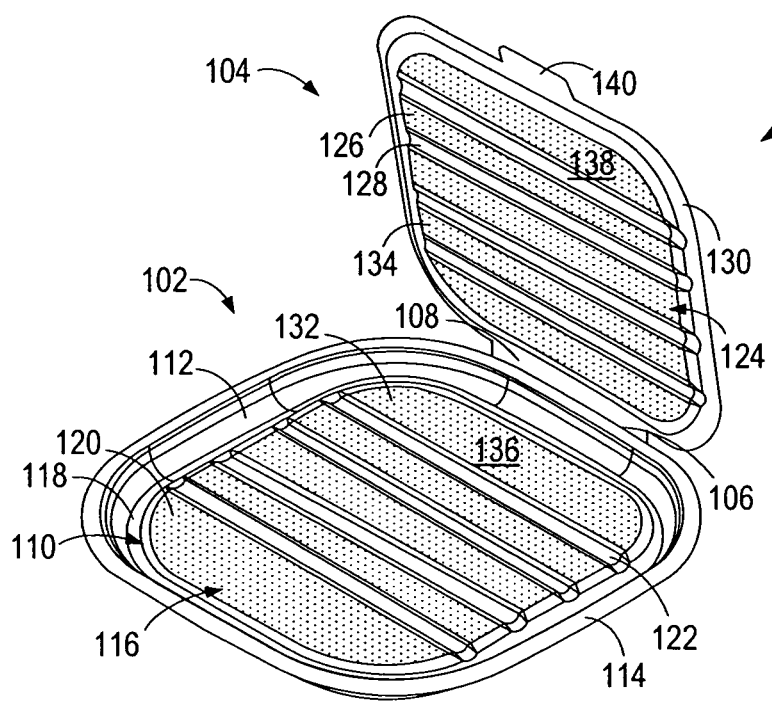
FIG. 1A is a schematic perspective view of an exemplary microwave heating apparatus, in a partially open configuration.

FIGS. 1A-1F schematically depict a microwave heating apparatus 100 (i.e., a microwave energy interactive heating apparatus) for preparing a food item, for example, a warm sandwich. As shown in FIG. 1A, the apparatus 100 generally includes a tray 102 and a cover 104 foldably joined to one another along a line of disruption (e.g., a score line, fold line, cut-crease line, perforation line, or the like), for example, a fold line 106, such that the cover 104 can be pivoted between an open position and a closed position relative to the tray 102. In the illustrated embodiment, the cover 104 is pivotably connected to the tray 102 by a separator panel 108. However, it is contemplated that the cover and tray may be joined in any other suitable manner. It is also contemplated that in other embodiments the tray 102 and cover 104 may be separate from one another (i.e., not joined to one another).

The tray 102 generally includes a base 110 and a wall 112 extending upwardly from a peripheral margin of the base 110. All or a portion of the wall 112 may have a sloped profile, as shown in FIGS. 1D and 1F, an upright profile, or any other suitable profile. A rim or flange 114 may extend around an uppermost margin of the wall 112. The wall 112 and/or flange 114 may be constructed to provide dimensional stability to the apparatus 100.

The base 110 generally includes a central portion 116 circumscribed by a peripheral portion 118. The peripheral portion 118 may have a slightly curved profile when viewed in cross-section, as shown in FIGS. 1D and 1F, or may have any other suitable profile. The central portion 116 includes a plurality of substantially planar surfaces or portions 120 that may be somewhat raised or elevated relative to the peripheral portion 118, such that the peripheral portion 118 defines a lowermost portion of the tray 102 (FIG. 1D). A plurality of elongated indentations, recesses, or channels 122 extend in a direction D1 (transverse to a direction D2) across the central portion 116 of the base 110 between the planar portions 120 to provide venting of moisture generated by the food item (FIG. 1E). The channels 122 generally recede in a downward direction towards the lowermost part of the base 110, in this instance, the peripheral portion 118. In the illustrated embodiment, the channels 122 do not extend as far downwardly as the lowermost point of the peripheral portion 118. However, it is understood that the channels 122 may have any suitable depth and may extend to the depth of the peripheral portion 118 if desired.

Likewise, as shown in FIGS. 1A, 1E, and 1F, the cover 104 may include a central portion 124 including a plurality of substantially planar surfaces or portions 126, and a plurality of elongated indentations, recesses, or channels 128 extending in a direction D1 (transverse to a direction D2) across the central portion 124 between, and receding from, the planar portions 126. The cover 104 also may include a rim 130 that circumscribes the central portion 124 and generally defines at least a portion of a peripheral margin of the cover 104.

When viewed in a fully open condition (FIGS. 1E and 1F), the rim 130 may define the lowermost portion of the cover 104, and the central portion 124 may be somewhat elevated relative to the rim 130. In the illustrated embodiment, the channels 128 do not extend as far downwardly as the lowermost point of the rim 130. However, it is understood that the channels 128 may have any suitable depth and may extend to the depth of the rim 130 if desired.

Conversely, when viewed in a fully closed condition (FIGS. 1B-1D), the rim 130 may define an uppermost portion of the cover 104 and the planar portion 126 of the cover 104 may define a lowermost portion of the cover 104. Optionally, the central portion 124 of the cover 104 may extend at least partially into the interior of the tray 102 when the cover 104 is in the closed position, as shown schematically in FIG. 1D. In other examples (not shown), the cover may be generally planar with a plurality of channels receding away from the planar surface, such that the central portion and the rim are substantially coplanar (i.e., the rim and the planar surface lie within substantially the same horizontal plane). In such an example, the cover may be sized and/or dimensioned to extend into the interior of the tray if desired, or may be dimensioned to be in face-to-face contact with the rim 114 of the tray 102.

Figure 1B:
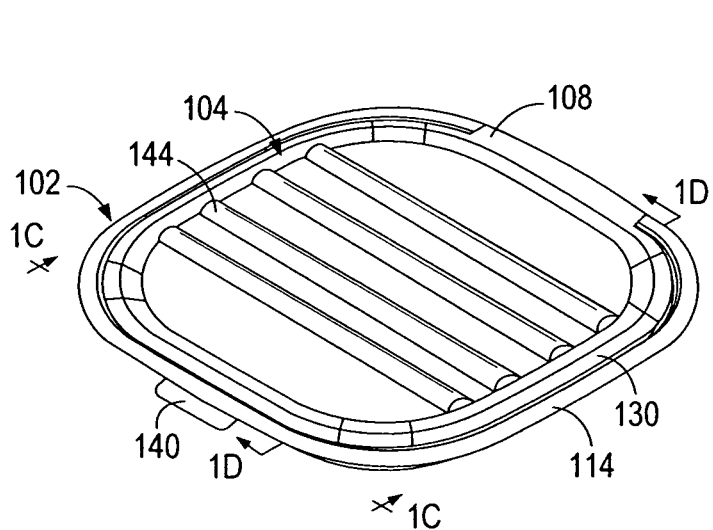
FIG. 1B is a schematic perspective view of the microwave heating apparatus of FIG. 1A, in a closed configuration.
Figure 1C:
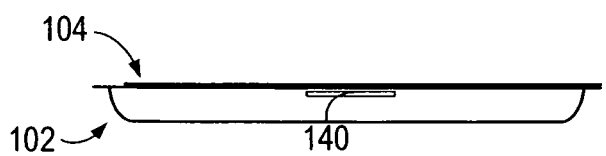
FIG. 1C is a schematic end view of the microwave heating apparatus of FIG. 1B, viewed along a line 1C-1C.
Figure 1D:
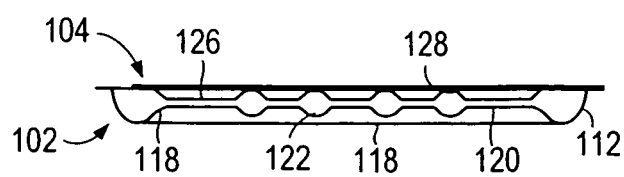
FIG. 1D is a schematic cross-sectional view of the microwave heating apparatus of FIG. 1B, taken along a line 1D-1D.

As shown in FIGS. 1B-1D, when the apparatus 100 is in a closed configuration, that is, when the cover 104 is brought into face-to-face contact with the tray 102, the respective channels 122, 128 are substantially in register with one another (FIG. 1D), with the respective channels 122, 128 in the base 110 and cover 104 receding away from one another. However, in other embodiments, the channels 122, 128 may be out of register (i.e., not aligned) with one another. Further, in this example, the base 110 and cover 104 each include four channels 122, 128 that are substantially parallel to one another, each channel 122, 128 having a substantially arcuate profile (e.g., curved or semi-circular) when viewed in cross-section (FIGS. 1D and 1F). However, any number, arrangement, and shape of channels 122, 128 may be used, as needed to provide the desired degree of venting for the particular heating application.

If desired, one or more microwave energy interactive elements 132, 134 (shown schematically with stippling in FIGS. 1A and 1E) may overlie at least a portion of the substantially planar portions 120, 126 of the tray 102 and/or cover 104, such that the planar portions 120, 126 serve as respective heating areas or surfaces 120, 126. In one example, the elements may be susceptors, which generally comprise a thin layer of microwave energy interactive material (generally less than about 100 angstroms in thickness, for example, from about 60 to about 100 angstroms in thickness) that tends to absorb at least a portion of impinging microwave energy and convert it to thermal energy (i.e., heat) at the interface with the food item. Susceptors often are used to promote browning and/or crisping of the surface of a food item. However, other microwave energy interactive elements may be used. The susceptors 132, 134 may be supported on a polymer film, which generally may define respective food-contacting surfaces 134, 136 of the tray 102 and cover 104. In the illustrated example, the susceptors 134, 136 only overlie the substantially planar surfaces 120, 126 of the tray 102 and cover 104. However, it is contemplated that the susceptor may overlie any other part of the tray 102 or cover 104, for example, any part intended to be in close proximity to the food item (e.g., channels 122, 128, the peripheral portion 118 of the base 110 and/or the wall 112 of the tray 102).

Still viewing the figures, the apparatus 100 may include a locking mechanism to releasably secure the cover 104 in a closed, superposed relationship with the tray 102. In this example, as best seen in FIGS. 1A, 1B, 1C, and 1E, the locking mechanism includes a tab 140 adapted to be received in a slot 142 (FIG. 1E) in the wall 112 of the tray 102. In this example, the tab 140 and the slot 142 are in respective portions of the cover 104 and tray 102 distal from the separator panel 108. If desired, the positions of the tab and slot could be interchanged, such that the slot in is in the cover and the tab extends from the tray.

To use the apparatus 100 according to one acceptable method, a food item (not shown) may be placed on the central portion 116 of the tray 102. The apparatus 100 may be closed by pivoting the cover 104 toward the tray 102 until the cover 102 is in a superposed relationship with the tray 102. In this configuration, the respective planar portions (i.e., the respective heating surfaces) 120, 126 of the tray 102 and cover 104 at least partially engage opposite surfaces of the food item. The cover 104 then may be locked in the closed position by inserting the tab 140 into the slot 142, as shown in FIGS. 1B and 1C.

It will be noted that FIGS. 1B-1D are representative of the closed apparatus 100 in an empty condition or containing a relatively thin food item. However, a food item having a greater thickness may cause the tray 102 and cover 104 to be more distant from one another in the closed configuration. In such an instance, some downward force may need to be exerted on the food item and/or tray 102 to insert the tab 140 into the slot 142. The cover 104 may remain urged toward the food item during the heating cycle, which may enhance heating, browning, and/or crisping further. In some examples, depending on the thickness of the food item and the force needed to engage the tab 140 and slot 142, this compressive force may advantageously be maintained even if the height of the food item, and therefore, the distance between the tray 102 and cover 104 decreases, for example, when a frozen cheese sandwich is heated. It will be understood that as the height of the food item decreases, the magnitude of the compressive force also may decrease. At the same time, as the magnitude of the compressive force decreases, the distance the tab 140 protrudes from the slot 142 may increase. Conversely, where an item expands during heating, the magnitude of the compressive force may increase and the distance the tab 140 protrudes from the slot 142 (on the exterior of the tray) may decrease. In either case, a compressive force may be maintained on the food item to secure the food item in position and provide the desired degree of heating, browning, and crisping of the food item.

As the microwave heating cycle proceeds, the susceptors 132, 134 convert at least a portion of the impinging microwave energy to thermal energy (i.e., sensible heat), which then may be transferred to the adjacent surface of the food item to enhance browning and/or crisping of the affected areas. At least some of any steam released from the food item may be carried away from the food item along the channels 122, 128, which serve as venting channels, thereby further enhancing browning and/or crisping. Additionally, the elevated central portion 116 of the tray 102 maintains the food item in an elevated position, which reduces the amount of sensible heat transferred from the susceptor 132 on the tray 102 to the ambient environment of the microwave oven, still further enhancing the browning and/or crisping of the food item. The pattern of browning and/or crisping may include an overall darkened appearance with somewhat lighter areas corresponding to the areas overlying channels 122, 128, generally resembling the visual appearance of grill marks. When the heating cycle is complete, the food item may be removed and the apparatus 100 may be discarded.

It will be noted that many conventional microwave heating packages including a susceptor are prone to warping or twisting as the susceptor generates thermal energy. However, the apparatus 100 of the present disclosure may be formed from materials having sufficient strength and/or rigidity to minimize any structural change or deformation. Further, the wall 112 of the tray 102, the locking mechanism (e.g., tab 140 and slot 142), and other components of the apparatus 100 may provide further structural stability, and therefore resistance to warping, during heating, so that the susceptors 132, 134 substantially remain in the desired position relative to the surfaces of the food item to attain the desired degree of heating, browning, and crisping of the food item.

Numerous other microwave heating apparatuses, constructs, and structures are encompassed by the disclosure. Any of such apparatuses have any suitable shape and dimensions, depending on the type of food item being heated, the desired heating time, the desired degree of browning and/or crisping, or any other suitable criteria. For example, in the illustrated embodiment, the central portions 116, 124 of the base 110 and cover 104 are substantially square in shape with rounded corners, and the peripheral portion 118 of the tray 102 is substantially square annular in shape with rounded corners. However, it is contemplated that any of the various parts of the apparatus 100 may have any suitable shape, for example, circular, square, triangular, or any other regular or irregular shape, as needed or desired for a given heating application.

Further, if desired, the base 110 and/or cover 104 and/or the respective heating surfaces 120, 126 may be contoured to accommodate the shape of a food item having a shaped or irregular surface, for example, a domed or bowed surface. In doing so, the microwave energy interactive elements may be brought into closer proximity with the surface of the food item. Numerous examples of contoured surfaces that may be suitable for use with the present invention are provided in U.S. Patent Application Publication No. 2008/0164178 A1, published Jul. 10, 2008, and U.S. Patent Application Publication No. 2008/0000896 A1, published Jan. 3, 2008, both of which are incorporated by reference herein in their entirety. In some instances, such contoured surfaces may cooperate with one or more venting channels and/or microwave transparent areas to create the visual appearance of grill marks.

As another example, the heating surfaces of the base and/or cover may be adapted to heat, brown, and/or crisp multiple food items concurrently, by for example, using more than one elevated area.

Further, any of the apparatuses according to the disclosure may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the apparatus.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

While susceptors are illustrated herein, the apparatus alternatively or additionally may include a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches.

Larger microwave energy reflecting elements may be used where the food item is prone to scorching or drying out during heating. Smaller microwave energy reflecting elements may be used to diffuse or lessen the intensity of microwave energy. A plurality of smaller microwave energy reflecting elements also may be arranged to form a microwave energy directing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The breaks or apertures may extend through the entire structure, or only through one or more layers. The number, shape, size, and positioning of such breaks or apertures may vary for a particular application depending on the type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in one or more layers or materials used to form the construct, or may be a non-physical "aperture". A non-physical aperture is a microwave energy transparent area that allows microwave energy to pass through the structure without an actual void or hole cut through the structure. Such areas may be formed by simply not applying a microwave energy interactive material to the particular area, or by removing microwave energy interactive material in the particular area, or by chemically and/or mechanically deactivating the microwave energy interactive material in the particular area. While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application. For example, where greater heating is desired, the total inactive area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance browning and/or crisping.

In some instances, it may be beneficial to create one or more discontinuities or inactive regions to prevent overheating or charring of the apparatus. When exposed to microwave energy, the concentration of heat generated by overlapping areas may be sufficient to cause the underlying support, in this case, paperboard, to become scorched. As such, the overlapping areas may be designed to be microwave energy transparent (as shown), for example, by forming such areas without a microwave energy interactive material, by removing any microwave energy interactive material that has been applied, or by deactivating the microwave energy interactive material in these areas.

Further still, one or more panels, portions of panels, or portions of the construct may be designed to be microwave energy transparent to ensure that the microwave energy is focused efficiently on the areas to be browned and/or crisped, rather than being lost to portions of the food item not intended to be browned and/or crisped or to the heating environment. This may be achieved using any suitable technique, such as those described above. For example, in the construct 100 illustrated in FIGS. 1A-1F, the channels 122, 128, wall 112, and various other portions of the apparatus 110 may be designed to be microwave energy transparent if such areas are not intended to be in intimate and/or proximate contact with the surface of the food item.

As stated above, the microwave energy interactive element may be supported on a microwave inactive or transparent substrate, for example, a polymer film or other suitable polymeric material, for ease of handling and/or to prevent contact between the microwave energy interactive material and the food item. Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Various materials may serve as the base material for the apparatus. For example, the apparatus may be formed at least partially from a polymer or polymeric material. As another example, all or a portion the apparatus may be formed from a paper or paperboard material. In one example, the paper has a basis weight of from about 15 to about 60 lbs/ream (lb/3000 sq. ft.), for example, from about 20 to about 40 lbs/ream. In another example, the paper has a basis weight of about 25 lbs/ream. In another example, the paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

The apparatus may be formed according to numerous processes known to those in the art, including using adhesive bonding, thermal bonding, ultrasonic bonding, mechanical stitching, or any other suitable process. Any of the various components used to form the apparatus may be provided as a sheet of material, a roll of material, or a die cut material in the shape of the apparatus to be formed (e.g., a blank).

In one example, the tray 102 and/or cover 104 each may be formed using a thermal, mechanical, or thermomechanical pressing technique. With such a method, the exterior side of the cover 104 may have a plurality of protrusions 144 corresponding to the channels or indentations 128 on the interior side of the cover 104, as shown in FIG. 1B. The tray 102 may similarly include a plurality of protrusions (not shown) on an exterior side of the base 110 opposite the channels or indentations 122. However, it is contemplated that in other embodiments, the exterior side of the tray 102 and/or cover 104 may be substantially planar and/or may be provided with indentations or channels on the respective interior side in some other suitable manner.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A microwave heating apparatus, comprising:
   a single piece of a laminate, wherein the single piece of the laminate comprises microwave energy interactive material supported on a polymer film, the microwave energy interactive material being operative for heating in response to microwave energy;
   a portion of the single piece of the laminate being a press-formed integral tray of the apparatus;
   another portion of the single piece of the laminate being a press-formed integral cover of the apparatus; and
   the press-formed integral tray and the press-formed integral cover being foldably joined to one another along a line of disruption in the single piece of the laminate,
   wherein the press-formed integral tray includes a base and a peripheral wall that define an interior space of the press-formed integral tray,
   the wall extends upwardly from a periphery of the base,
   the upwardly extending wall extends around the interior space,
   an upper surface of the base comprises a plurality of heating areas and a plurality of downwardly extending press-formed channels disposed between the heating areas,
   a lower, exterior surface of the base comprises a plurality downwardly extending press-formed protrusions, the press-formed protrusions being respectively vertically aligned with the press-formed channels,
   the heating areas are elevated relative to the press-formed channels, and
   the heating areas each include the microwave energy interactive material.

2. The apparatus of claim 1, wherein the heating areas have a substantially planar surface for being in contact with food.

3. The apparatus of claim 1, wherein the press-formed channels have a substantially arcuate profile.

4. The apparatus of claim 1, wherein the press-formed channels are substantially parallel to one another.

5. The apparatus of claim 1, wherein the press-formed integral cover includes
   a plurality of heating areas, the heating areas each including the microwave energy interactive material, and
   a plurality of press-formed channels disposed between the heating areas, wherein the press-formed channels extend upwardly away from the press-formed integral tray when the press-formed integral cover is in a closed position.

6. The apparatus of claim 5, wherein the heating areas of the press-formed integral cover have a substantially planar surface for being in contact with food.

7. The apparatus of claim 5, wherein the heating areas of the press-formed integral tray and the heating areas of the press-formed integral cover are in register with one another when the press-formed integral cover is in the closed position.

8. The apparatus of claim 5, wherein the heating areas of the press-formed integral tray and the heating areas of the press-formed integral cover are out of register with one another when the press-formed integral cover is in the closed position.

9. The apparatus of claim 5, wherein the press-formed integral cover further includes a substantially planar rim extending along a peripheral margin of the press-formed integral cover.

10. The apparatus of claim 9, wherein the rim defines an uppermost portion of the press-formed integral cover when the press-formed integral cover is in the closed position.

11. The apparatus of claim 9, wherein the rim is substantially coplanar with the heating areas of the press-formed integral cover.

12. The apparatus of claim 1, wherein a peripheral portion of the base extends around the heating areas and defines a lowermost portion of the press-formed integral tray.

13. The apparatus of claim 5, wherein the heating areas of the press-formed integral cover extend into the interior space when the press-formed integral cover is in a closed position.

14. The apparatus of claim 1, wherein
   the press-formed integral cover includes a locking tab extending from the press-formed integral cover, and
   the press-formed integral tray includes a receptacle for receiving the locking tab.

15. The apparatus of claim 1, wherein another portion of the single piece of the laminate is shaped to further define a separator panel disposed between the press-formed integral cover and the press-formed integral tray.

16. A microwave heating apparatus, comprising:
   a piece of a laminate, wherein the laminate comprises microwave energy interactive material supported on a polymer film, the microwave energy interactive material being operative for heating in response to microwave energy;

a portion of the piece of the laminate being a press-formed integral tray of the apparatus; and another portion of the piece of laminate being a press-formed integral cover of the apparatus;

the press-formed integral tray and the press-formed integral cover being foldably joined to one another along a line of disruption in the laminate so that the press-formed integral cover can be moved between an open position and a closed position, the press-formed integral tray including an upright wall extending around an interior space of the press-formed integral tray, wherein the press-formed integral tray and the press-formed integral cover each comprise an interior side and an exterior side, and the interior side of the press-formed integral tray and the interior side of the press-formed integral cover each include a plurality of elongate press-formed protrusions that extend towards the interior space when the press-formed integral cover is in the closed position, and a plurality of elongate press-formed indentations between the press-formed protrusions, wherein the press-formed indentations extend away from the interior space when the press-formed integral cover is in the closed position, and the exterior side of the press-formed integral tray and the exterior side of the press-formed integral cover each respectively include a plurality of press-formed protrusions in register with the press-formed indentations on the interior side of the press-formed integral tray and the interior side of the press-formed integral cover.

17. A microwave heating apparatus, comprising:

a single piece of a laminate, wherein the single piece of the laminate comprises microwave energy interactive material supported on a polymer film, the microwave energy interactive material being operative for heating in response to microwave energy;

a portion of the single piece of the laminate being a press-formed integral tray of the apparatus;

the press-formed integral tray including an upright wall extending around an interior space of the press-formed integral tray;

another portion of the single piece of the laminate being a press-formed integral cover of the apparatus;

the press-formed integral tray and the press-formed integral cover being foldably joined to one another along a line of disruption in the single piece of laminate so that the press-formed integral cover can be moved between an open position and a closed position relative to an upper opening of the press-formed integral tray, wherein the press-formed integral tray includes an interior side and an exterior side, the interior side of the press-formed integral tray including a plurality of substantially planar heating areas for being in contact with food on the press-formed integral tray, and a plurality of elongate press-formed channels between the heating areas, wherein the press-formed channels extend downwardly away from the heating areas so that the elongate press-formed channels are not for being in contact with food on the press-formed integral tray, and the exterior side of the press-formed integral tray including a plurality of indentations in register with the heating areas on the interior side of the press-formed integral tray, and a plurality of press-formed protrusions in register with the press-formed channels on the interior side of the press-formed integral tray.

18. A microwave heating apparatus, comprising:

a piece of a laminate, wherein the piece of the laminate comprises microwave energy interactive material on a polymer film, the microwave energy interactive material being operative for heating in response to microwave energy;

a portion of the piece of the laminate being a press-formed integral tray of the apparatus;

the press-formed integral tray including an upright wall extending around an interior space of the press-formed integral tray;

another portion of the laminate being a press-formed integral cover of the apparatus;

the press-formed integral tray and the press-formed integral cover being joined to one another along a fold line in the piece of laminate so that the press-formed integral cover can be moved between an open position and a closed position relative to an upper opening of the press-formed integral tray, wherein the press-formed integral tray and the press-formed integral cover each comprise an interior side and an exterior side, and the interior side of the press-formed integral tray and the interior side of the press-formed integral cover each include a plurality of substantially planar heating surfaces for being in contact with food, and a plurality of press-formed channels between the heating surfaces, wherein the press-formed channels extend away from the heating surfaces so that the press-formed channels are not for being in contact with food, and wherein the press-formed integral cover includes a tab opposite the fold line joining the press-formed integral tray and the press-formed integral cover to one another, wherein the tab comprises the laminate so that the tab is integral with the press-formed integral tray and the press-formed integral cover, the press-formed integral tray includes a slot for receiving the tab within the interior space of the press-formed integral tray, the slot being opposite the fold line joining the press-formed integral tray and the press-formed integral cover to one another, and when the press-formed integral cover is in the closed position with the tab received in the slot, the press-formed integral cover extends obliquely downwardly from the fold line towards the tab and slot.

19. A microwave heating apparatus, comprising:

a single piece of a laminate consisting essentially of a layer of microwave energy interactive material supported on a polymer film, the microwave energy interactive material being operative for heating in response to microwave energy, a layer of paperboard having a basis weight of from about 60 to about 330 lb/ream, and a layer of adhesive positioned directly between the layer of microwave energy interactive material and the layer of paperboard, so that the layer of microwave energy interactive material is joined to the layer of paperboard by the layer of adhesive;

a portion of the single piece of the laminate being a press-formed integral tray of the apparatus;

the press-formed integral tray including a base, and an upright peripheral wall extending around an interior space of the press-formed integral tray;

another portion of the single piece of the laminate being a press-formed integral cover of the apparatus;

the press-formed integral tray and the press-formed integral cover being foldably joined to one another along a line of disruption in the single piece of laminate so that the press-formed integral cover can be moved between an open position and a closed position relative to an upper opening of the press-formed integral tray, wherein the polymer film defines an interior surface on an interior side of the press-formed integral tray and the press-formed integral cover, the paperboard defines an exterior surface on an exterior side of the press-formed integral tray and the press-formed integral cover, the interior side of the press-formed integral tray and the interior side of the press-formed integral cover include elongate press-formed protrusions that extend towards one another when the press-formed integral cover is in the closed position, the press-formed protrusions of the press-formed integral cover extending into the interior space of the press-formed integral tray, wherein the press-formed protrusions of the press-formed integral tray and the press-formed protrusions of the press-formed integral cover are substantially parallel to one another when the press-formed integral cover is in the closed position, and elongate, arcuate press-formed indentations between the press-formed protrusions, wherein the press-formed indentations extend away from one another when the press-formed integral cover is in the closed position, and the exterior side of the press-formed integral tray and the exterior side of the press-formed integral cover include a plurality of press-formed protrusions in register with the respective press-formed indentations on the interior side of the press-formed integral tray and the interior side of the press-formed integral cover.

\* \* \* \* \*